W. F. COTTRELL.
FLEXIBLE COVER FOR LAMINATED VEHICLE SPRINGS.
APPLICATION FILED SEPT. 17, 1918.

1,307,657.
Patented June 24, 1919.

INVENTOR
WILLIAM FREDERICK COTTRELL
By
Attorney.

UNITED STATES PATENT OFFICE.

WILLIAM FREDERICK COTTRELL, OF FISHPONDS, ENGLAND.

FLEXIBLE COVER FOR LAMINATED VEHICLE-SPRINGS.

1,307,657. Specification of Letters Patent. Patented June 24, 1919.

Application filed September 17, 1918. Serial No. 254,519.

*To all whom it may concern:*

Be it known that I, WILLIAM FREDERICK COTTRELL, a subject of the King of Great Britain and Ireland, and a resident of Fishponds, county of Gloucester, England, have invented a certain new and useful Improvement in Flexible Covers for Laminated Vehicle-Springs, of which the following is a specification.

This invention relates in general to covers for laminated vehicle springs, and more particularly to a novel improvement in flexible cover construction especially adapted for use in covers of the type employed in connection with laminated springs for motor cars.

It has been found desirable to make the cover for a laminated spring for a motor car in such manner that when said cover is in position on the spring, there obtains at each end of said cover a closure on the spring which prevents the exudation of grease from said cover, and also the entry of dust into said cover. It has also been found desirable that there should be a direct and liquid-tight connection at the meeting edges of the cover.

A further feature of the invention is to provide a novel fastening means whereby the meeting edges of the cover may be readily drawn together and locked.

With these objects in view, the invention consists in the novel construction, combination and arrangement of parts hereinafter described, illustrated and pointed out in the appended claim.

The invention is illustrated by the accompanying sheet of drawings, which shows the invention as applied to a lubricating cover for a laminated spring of a motor car.

In carrying out the invention, the cover $a$, of leather or other suitable material is provided in and at each end with a short tube $b$, of leather or other suitable material, adapted to fit around the inside of each end of said cover and over the spring ends, so that when the ends of said cover have been fastened around said spring ends, there obtains a perfect non-leaking and dust-tight closure on the ends of the spring.

Figure 1:
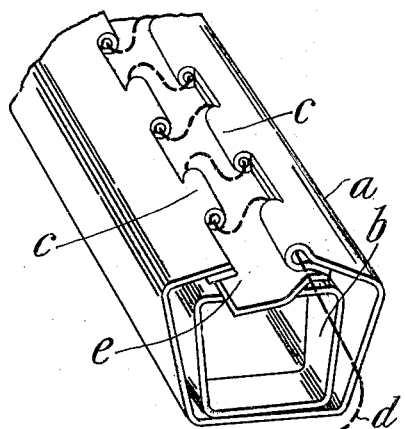
Figure 1 shows part of a cover opened out.
Figure 2:
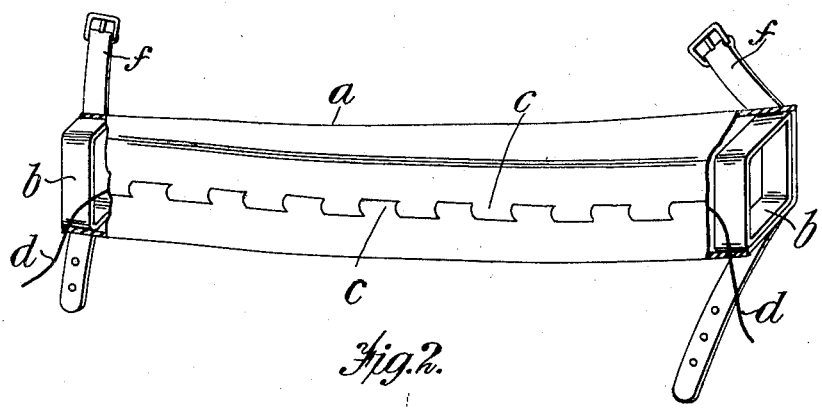
Fig. 2 shows a cover closed up as when in position on a spring, the cover being partly broken away.

To draw and fasten the meeting edges of the cover together, said meeting edges are provided with a series of interengaging or interlocking loops $c$ and through said loops $c$ is threaded, in the manner indicated in dotted lines in Fig. 1, a thong or the like $d$, which cord $d$ on being pulled taut and straight brings the looped edges into engagement with one another as shown in Fig. 2.

To prevent dust or liquid passing between the edges of the loops $c$ and penetrating to the interior of the cover $a$, there is provided a longitudinally extending tongue $e$ which is attached to the underside of one of the meeting edges of the cover, and to more securely fasten the cover $a$ to the spring, buckles and straps $f$ may be employed.

Having now described my invention, what I claim as new and desire to secure by Letters Patent of the United States is:—

Flexible covers for laminated vehicle springs, including in combination, a leather cover, a leather tube located in and at each end of said cover, a series of interengaging loops on the meeting edges of said cover, a thong threaded through said loops, and a tongue located inside and along one meeting edge of said cover.

In testimony whereof I have affixed my signature hereto this 19th day of August 1918.

WILLIAM FREDERICK COTTRELL.